Sept. 3, 1963  W. PEDDINGHAUS ETAL  3,102,620
ROTATING KEY CLUTCH
Filed May 12, 1958  2 Sheets-Sheet 1
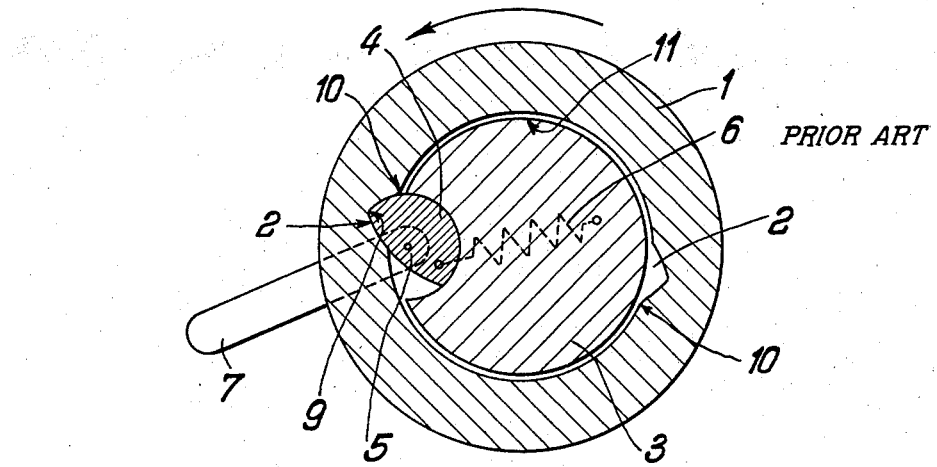
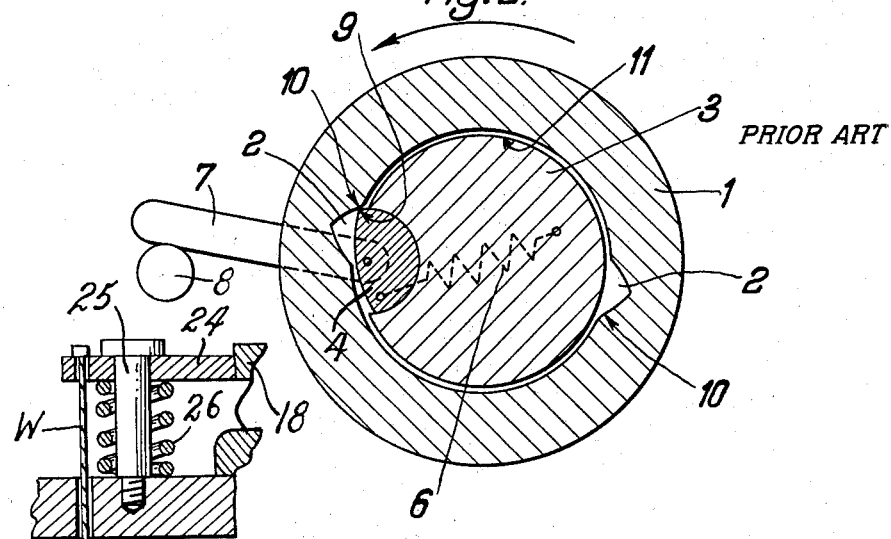
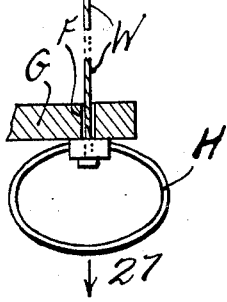
Inventors:
WERNER PEDDINGHAUS,
EMIL FUNKE
by Mestern & Kollin,
ATTORNEYS

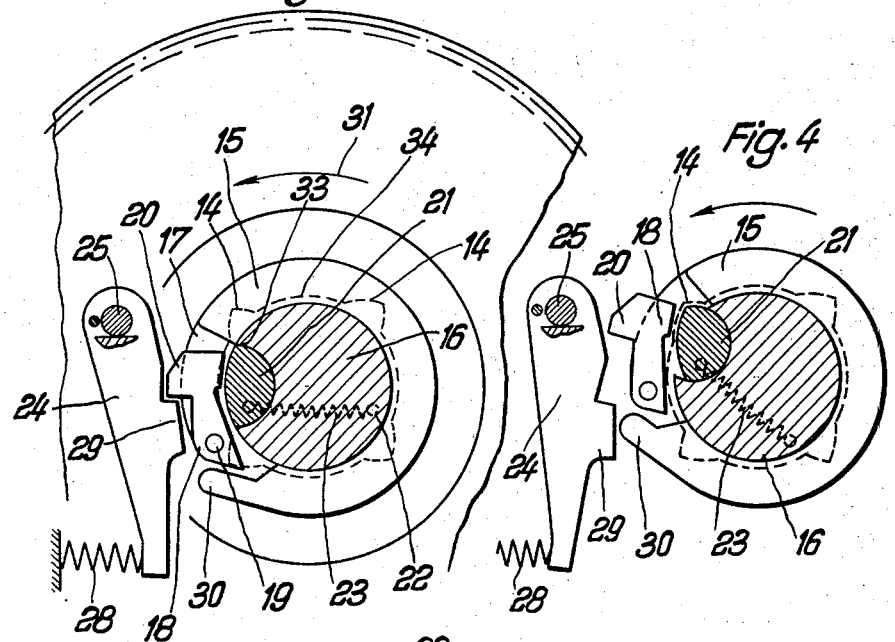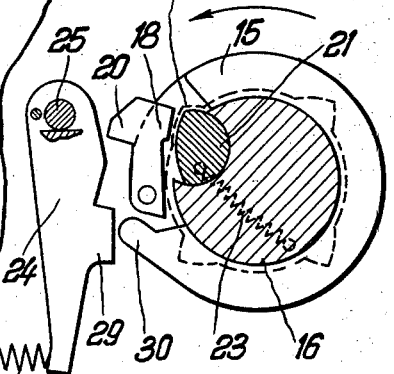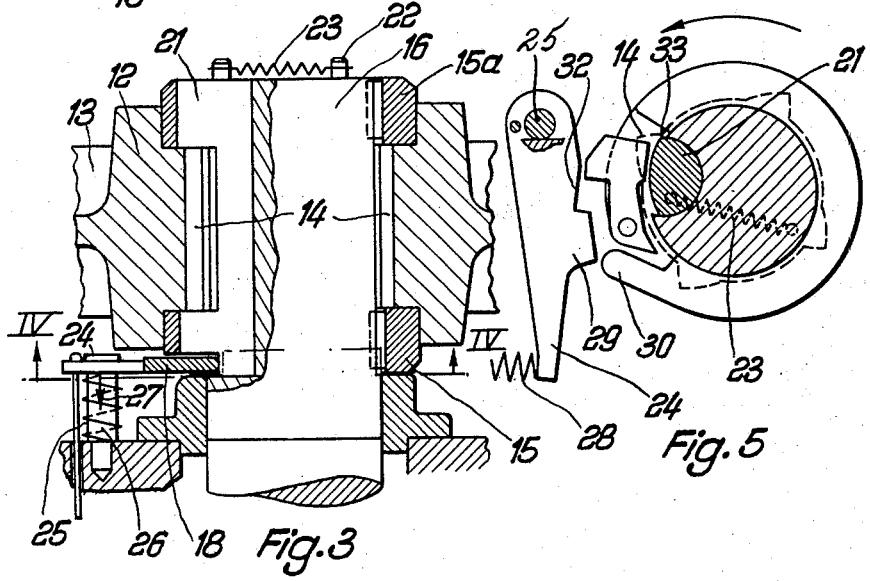

United States Patent Office 3,102,620
Patented Sept. 3, 1963

3,102,620
ROTATING KEY CLUTCH
Werner Peddinghaus and Emil Funke, Gevelsberg, Westphalia, Germany, assignors to Paul Ferd. Peddinghaus, Gevelsberg, Westphalia, Germany
Filed May 12, 1958, Ser. No. 734,456
Claims priority, application Germany May 17, 1957
1 Claim. (Cl. 192—29)

This invention relates to a clutch which is disengageable after one or more complete revolutions of the driven part of the clutch. Such complete revolution clutches, which are often termed "single-revolution clutches," are chiefly used with machines having a tool which traverses a definite and invariable path during each operating step, for example, in shearing machines, stamping machines and presses.

In clutches of the aforesaid type, a coupling member is movably mounted in the driven part of the clutch, and when the clutch is engaged, this member is held by spring action in engagement with a notch of the driving half of the clutch and, after one or more complete revolutions of the driven half, can be brought out of engagement with the driving half against the action of the spring by a control member controlled by the driven half. This coupling member is frequently in the form of a rotary key. Instead of a rotary key, a slidable key which is movable in the driven half can also be used. For the sake of simplicity the coupling member will hereinafter be termed "a key" whether it is rotatable or slidably displaceable.

Clutches having the features mentioned, after running for a shorter or longer time, are inclined to produce a clicking noise at each revolution when in the disengaged state. This noise is hereinafter termed "knocking." The noise which is often unbearably loud is, in itself, undesirable. The cause of the noise, namely the knocking together of two parts which leads to rapid wear, is much more objectionable. The result of this is that these rigid clutches, which work without friction losses and are, therefore, preeminently suitable for shearing machines, stamping machines, presses and the like, have been replaced by less suitable friction clutches which are considerably more expensive and complicated.

In the known clutches the knocking occurs owing to the fact that disengagement takes place at the moment when the key leaves the notch in the driving part of the clutch. The key has no inducement to move out of the position which it occupies at this moment. Its edge, therefore, grinds against the driving part of the clutch and each time the notch in the driving part passes the key strikes the edge of the notch with a more or less hard blow. This knocking would not occur if the driven part always came to rest with mathematical accuracy in the same angular position and all parts could be made with absolute accuracy and the edges of the key and the notch were perfect edges. None of these requirements can be fulfilled. In particular the edges must be rounded to a certain extent from the start, in order to keep the surface pressure within permissible limits. These rounded edges cause the key, when it is rotated or drawn out of the notch, to be thrown out of the notch in the last phase of this movement by the force acting between the rounded edges and to snap back under the action of its spring into a position from which it returns to a slight extent into the notch at each passage of the notch.

By means of the invention the knocking and its cause are obviated. According to the invention the key, on being disengaged by the control member, is positively brought into a position in which it is held completely and continuously out of contact with the driving part of the clutch. This result is obtained owing to the fact that the force which acts on the key through the control member is made independent of the angle of rotation of the driven clutch part, that is to say the force is always fully effective without regard to the position which the driven part takes up after disengagement.

In the drawing:
FIGS. 1 and 2 are cross-sectional views of a conventional single-revolution clutch to which the present improvement is applicable, shown in different positions;
FIG. 3 shows a longitudinal section through a clutch embodying the invention;
FIG. 4 is a cross-sectional view taken on the line IV—IV of FIG. 3;
FIGS. 5 and 6 are views similar to FIG. 4 but showing the clutch in different positions; and
FIG. 7 illustrates in enlarged detail view, the means for moving a clutch-controlling member into operative and inoperative positions.

Before the invention is described in greater detail, an explanation will be given with the aid of FIGS. 1 and 2 as to how the knocking in the known clutches occurs. In these figures a primitive form of a single-revolution clutch with a rotary key has been chosen for illustrative purposes.

In FIGS. 1 and 2 the driving half of the clutch consists of a sleeve 1 which rotates in the sense indicated by the arrow and is formed on its inner surface with tooth-shaped notches 2. The driven half of the clutch in the form of a shaft 3 is rotatable in the interior of the sleeve 1. A rotary key 4 can rotate in the shaft 3 about an axis 5. A spring 6 tends to hold the key in engagement with one of the notches 2 when the clutch is engaged, as shown in FIG. 1. To the key 4 is rigidly connected an arm 7 in the path of which a control member 8 can be interposed when the clutch is to be disengaged. For this purpose the control member is movable radially or at right angles to the plane of the drawing.

FIG. 2 shows the control member 8 in its operative position. The arm 7 has struck against the control member 8 and has rotated the key 4 into a position which immediately precedes the moment of disengagement. Disengagement takes place when the edge 9 of the key slides off the edge 10 of the notch. These edges are rounded. In the last phase of the movement which directly follows the position shown in FIG. 2 the key is not moved by the arm 7 but is carried out of the notch 2 by the force exerted by the rounded edge 10 on the rounded edge 9, so that the shaft 3 comes to rest. Owing to this, the arm 7 does not take up the position in which the key is rotated fully into the shaft 3, but from then on the edge of the key continuously slides against the inner surface 11 and, each time the notches pass, the key enters so far into the notches that the edges 9 and 10 again strike against one another.

The knocking caused in this way, with the consequent premature wear, takes place not only in the primitive form shown in FIGS. 1 and 2, but always when the key is brought by the driven clutch part into the disengaged position. In the clutch according to the invention this is not the case. On the contrary, in the clutch of the invention the control member, after it has been released by the driven clutch part, acts on the key with a force which is independent of the rotation of the clutch and brings it into a position in which it remains completely out of engagement with the driving part of the clutch. This force can be produced by mechanical, hydraulic, pneumatic or electric means. In the simplest case it is produced by a spring which is energized by the rotation of the clutch. This case will now be explained with the aid of FIGS. 3–6.

In FIGS. 3–6, the driving part of the clutch consists of a sleeve 12 which is formed by the hub of a toothed wheel 13 and is provided on its inner surface with notches 14. This sleeve wheel runs on two bearing rings 15 and 15a which are mounted fixedly on a shaft 16 and form the driven half of the clutch. A transmission element or pawl 18, which can rock about a pivot 19, is mounted in a recess 17 of the ring 15 and has a lug 20 which projects radially outwards. A coupling member or key 21 is rotatable in the shaft 16 and a helical spring 23 which is anchored at 22 to the shaft 16 acts on the key 21. An actual element or lever 24 which forms the control member is mounted outside the clutch on a pivot 25 about which it can be rotated and axially shifted downwardly from the position shown in FIG. 3. A helical spring 26 tends to press the lever 24 into the position shown in FIG. 3 in which it is situated in the plane of the pawl 18. By means of tackle W secured to lever 24, and guided through a slot F in frame G as shown in FIG. 7, and provided with a handle H the lever 24 can be moved against the action of the spring 26 in the direction of the arrow 27 out of the plane of the pawl 18 into an inoperative position. The clutch stays engaged as long as the operator is pulling handle H in the direction of arrow 27. When handle H is released, spring 26 forces member 24 back into the effective position, and the clutch performs at the most one more rotation, until it is disengaged automatically. A spring 28 also acts on the lever 24 and tends to rotate it in a counterclockwise sense (as viewed in FIGS. 4–6) about the pivot 25. When the lever is in the position shown in FIG. 3 its projection 29 slides on the periphery of the ring 15 and forms an abutment for a cam 30 on that ring. The clutch rotates in the sense indicated by the arrow 31.

When the clutch is engaged, the lever 24 is in an inoperative position outside the rotational plane of the pawl 18. If the clutch is to be disengaged the lever is allowed to assume the position shown in FIG. 3 under the action of the spring 26. Three successive phases of the disengagement process are shown in FIGS. 4–6.

In FIG. 4 the clutch is still fully engaged. The key 21 is, therefore, fully in engagement with one of the notches 14. The projection 29 of the lever 24 bears against the stop means or projection 30 under the pressure of the spring 28. On further rotation the parts arrive in the position shown in FIG. 5. The lever 24 has been slightly rotated by the spring 28 toward the pawl 18 as the projection 30 passes. The flank 32 of the lever 24 has then come into contact with the lug 20 of the pawl 18, so that the spring 28 now acts through the pawl 18 on the key 21 and has begun to rotate it against the action of the spring 23 out of the notch 14. Thus the projection 30 acts as a cam holding the lever 24 out of engagement with the pawl 18 until the members 15, 16, 18 have rotated into a position wherein release of the lever 24 by the projection 30 results in an inward movement of the lever and a consequent displacement of pawl 18 to force the key 21 fully into its disengaged position. In FIG. 5 the key 21 is shown to be on the verge of completely leaving the notch 14. The flank 32 is so formed that in the last phase it holds the key in engagement only by a distance of about 1 to 2 mm., so that on further rotation it may arrive in its proper disengaging position and then disappear suddenly completely into the shaft 16 whereby the latter comes to rest at the predetermined place. At this point the clutch occupies the position shown in FIG. 6. On reaching this position, the spring 28 swings the key 21 through the agency of the lever 24 and the pawl 18 into a position in which it lies completely out of engagement with the notch 14 with its edge 33 at a distance from the inner surface 34 of the sleeve 12. The contact between the key and the drive member is dependent on the position of the driven member. The driven member must be in such a position that the key will be contacted by the pawl 18 through the force of spring 28 before contact will be independent of the position of the driven member. The contact between the key and the drive member is dependent on the position of the driven member. The driven member must be in such a position that the key will be contacted by the pawl 18 through the force of spring 28 before contact will be independent of the section of the driven member. FIG. 6 shows that the disengaged key does not alter its position if the shaft 16 is slightly rotated in one sense or the other relative to the position shown in the drawing. The projection 29 of the lever 24 which is disposed between the lug 20 and the projection 30 prevents excessive rotation in either direction.

In the drawing the projection 30 is rigid. It is advisable, however, to provide instead of a rigid projection a rotatable projection which, by moving out of the way, effects a considerably quicker release of the lever 24 which itself causes a sudden disconnection of the key. Such a projection may also move out of the way if the clutch should run in the reverse sense owing to the motor being wrongly connected.

The pawl 18 represents an intermediate member which is provided for constructional reasons. It is not a necessary element and can be omitted, for example in clutches with a slidable key where the structural details are different.

Various modifications may be made. For example, for engaging the clutch a circuit could be closed by a contact controlled by the clutch and the current used to produce an electro-magnetic force which allows the control member to become effective and completely to disengage the key. Similarly, the control member can be actuated hydraulically or pneumatically. The important feature of the invention is that the force which disengages the key is independent of when and in what angular position of the driven part the key is disengaged from the notch.

We claim:

A clutch comprising a continuously rotatable drive member provided with at leats one recess; a driven member journaled for rotation relative to said drive member; a spring-biased coupling member on said driven member normally engageable with said recess in one position of said coupling member for entraining said driven member along with said drive member, said coupling member being completely disengaged from said drive member in another position thereof; control means including a transmission element on said driven member in engagement with said coupling member and a spring-biased actuating element engageable with said transmission element, effective at a first angular position of said driven member for partially withdrawing said control member out of engagement with said recess and at a second angular position offset by a fraction of a revolution from said first angular position for completing the displacement of said coupling member into said other position and temporarily maintaining said coupling member completely disengaged from said drive member in all relative angular positions of said drive and said driven members, said elements being formed with coacting cam means engageable at said first angular position for displacing said control member and abutment means engageable at said second angular position, said driven member being formed with stop means engageable with said actuating element for holding said actuating element out of engagement with said transmission element until said driven member reaches said first angular position; and operating means for inactivating said control means, thereby permitting entrainment of said driven member by said drive member.

References Cited in the file of this patent

UNITED STATES PATENTS

| | | |
|---|---|---|
| 1,269,057 | Criner | June 11, 1918 |
| 1,711,288 | Schloz et al. | Apr. 30, 1929 |
| 2,014,234 | Klocke | Sept. 10, 1935 |
| 2,368,892 | Skoog | Feb. 6, 1945 |
| 2,436,112 | Machado | Feb. 17, 1948 |
| 2,517,473 | Filarski | Aug. 1, 1950 |